United States Patent
Flormann

(12) 
(10) Patent No.: US 6,429,944 B1
(45) Date of Patent: Aug. 6, 2002

(54) PROCESS AND DEVICE FOR DETERMINING THE THICKNESS TRANSVERSE PROFILE AND THICKNESS LONGITUDINAL PROFILE OF A RUNNING STRIP OF MATERIAL

(75) Inventor: Paul Flormann, Heiligenhaus (DE)

(73) Assignee: IMS Messsysteme GmbH, Heiligenhaus (DE)

( * ) Notice: Subject to any disclaimer, the term of this patent is extended or adjusted under 35 U.S.C. 154(b) by 0 days.

(21) Appl. No.: 09/688,620

(22) Filed: Oct. 16, 2000

(30) Foreign Application Priority Data

Oct. 18, 1999 (DE) .......................................... 199 50 254

(51) Int. Cl.$^7$ ............................................. G01B 11/06
(52) U.S. Cl. ...................... 356/630; 356/634; 356/637; 356/615; 356/238.2; 356/243.7
(58) Field of Search .............................. 356/630, 237.1, 356/238.1, 238.2, 238.3, 636–637, 615, 635, 243.7; 250/358.1, 359.1, 360.1, 366; 378/51, 54–55; 246/40.2

(56) References Cited

U.S. PATENT DOCUMENTS

| | | | |
|---|---|---|---|
| 3,766,386 A | * 10/1973 | Sivilotti et al | 250/83.3 |
| 3,868,510 A | * 2/1975 | Murata et al. | 250/366 |
| 3,974,248 A | * 8/1976 | Atkinson | 246/40.2 |
| 4,037,104 A | * 7/1977 | Allport | 250/359 |
| 4,542,297 A | 9/1985 | Hold | |
| 4,633,420 A | 12/1986 | Masanobu | |
| 4,759,046 A | 7/1988 | Kopineck et al. | |
| 5,202,909 A | 4/1993 | Gauje | |
| 5,255,302 A | 10/1993 | Shimamune et al. | |
| 5,298,122 A | 3/1994 | Munch et al. | |
| 5,440,386 A | 8/1995 | Campas | |
| 5,504,794 A | 4/1996 | Campas et al. | |

FOREIGN PATENT DOCUMENTS

| | | |
|---|---|---|
| DE | 3530109 | 3/1987 |
| DE | 3707107 | 9/1988 |
| DE | 3827084 | 11/1989 |
| DE | 69104164 | 3/1992 |
| DE | 69408023 | 11/1994 |
| DE | 19844756 | 8/1999 |

* cited by examiner

*Primary Examiner*—Frank G. Font
*Assistant Examiner*—Sang H. Nguyen
(74) *Attorney, Agent, or Firm*—Frishauf, Holtz, Goodman & Chick, P.C.

(57) ABSTRACT

A process for the determination of the thickness transverse profile and the thickness longitudinal profile of a running material strip. The process includes (a) determining the strip thicknesses in at least two measuring areas, (b) determining the longitudinal position of the thickness longitudinal profile, (c) measuring the strip thickness in the longitudinal position and setting a correction value to be zero, (d) measuring an adjustment setting ($\Delta P$) of the measuring unit for the longitudinal position, (e) calculating the gradient (k) of the strip thicknesses transverse to the direction of travel of the strip, (f) recalculating the correction value ($\Delta K$) from the previous correction values and the product of (k) and ($\Delta P$), (g) calculating the mean strip thickness ($D_m$), (h) calculating the corrected strip thickness in the longitudinal position as the sum of ($D_m$) and ($\Delta K$), (i) repeating steps (d) to (h) within an adjustment movement cycle and (j) determining the thickness transverse profile from the strip thickness and the thickness longitudinal profile from the mean strip thickness.

25 Claims, 4 Drawing Sheets

PROCESS AND DEVICE FOR DETERMINING THE THICKNESS TRANSVERSE PROFILE AND THICKNESS LONGITUDINAL PROFILE OF A RUNNING STRIP OF MATERIAL

BACKGROUND OF THE INVENTION

1. Field of the Invention

The invention relates to a process and device for determining the thickness transverse profile and thickness longitudinal profile of a running strip of material.

2. Background Information

The are already a large number of measuring processes known in the prior art. The main objective in each case is to acquire precisely the thickness transverse profile, i.e. the measurement of the strip thickness over the width of the strip transverse to the direction of run of the strip, and the strip longitudinal profile, i.e. the measurement of the strip thickness in the centre of the strip or at other longitudinal positions lengthways to the direction of run of the strip. This objective has hitherto only been fulfilled if, during the measuring process, the band thickness is acquired simultaneously in the centre of the strip and the band thickness in the individual strip position in each case, transverse to the strip.

This is achieved, for example, by the simultaneous multi-channel profile measurement process, in which, on the one hand, in the centre of the material strip a measuring unit consisting of at least one source of radiation and at least one detector makes direct measurements of the thickness of the strip, and therefore determines the thickness longitudinal profile. On the other hand, separate measuring units are provided for, intended to determine the thickness transverse profile, which acquire the area of the edges of the material strip. Due to the requirements indicated above with regard to the scale of the values to be measured and the precision of measurement required, the known devices are correspondingly elaborate and expensive. Thus, for example, at least two separate measuring units with a measuring head each are required, consisting of an arrangement of a radiation source and at least one detector, or one measuring unit with several measuring heads.

The processes and devices described in the foregoing are intended predominantly for continuous casting, for blooming trains, or for the intake of manufacturing stepped rolls. This is due to the fact that further progress in the optimisation of the rolling process of metal strips with stepped rolls can no longer be considered without a precise knowledge of the circumstances in the intake area.

SUMMARY OF THE INVENTION

The invention is therefore based on the technical problem of reducing the technical elaboration and expense of the measuring device, while still maintaining a precise determination of the thickness transverse profile and the thickness longitudinal profile of a running strip of material.

The technical problem outlined above is resolved according to the invention by a process:

a) In which, with the aid of a measuring unit, strip thicknesses D are determined in at least two measurement areas, whereby one measuring unit features at least one radiation source 8 and at least two detectors 10, whereby a measurement area 22 is the volumetric area of the material strip 2, which has been run through by the radiation, this radiation being measured by a detector 10 allocated for this purpose, and whereby the measurement areas are arranged at a distance from one another transverse to the direction of run of the strip;

b) In which the longitudinal position of the thickness longitudinal profile to be determined is determined longitudinally to the direction of run of the strip;

c) In which the band thickness Do in the longitudinal position is measured directly by the measuring unit, and the value of a correction value ΔK is equal to zero;

d) In which the measuring unit is set transverse to the direction of run of the strip and the amount of the setting ΔP is determined by relation to the longitudinal position;

e) In which, from the strip thicknesses D determined at the measuring areas, the gradient k of the strip thicknesses D transverse to the direction of run of the strip is calculated;

f) In which the correction value ΔK is recalculated as the total from the previous correction value ΔK and the product of the gradient k and the value of the setting ΔP;

g) In which the mean strip thickness $D_m$ is calculated from the strip thicknesses D determined in the measurement areas;

h) In which the corrected strip thickness $D_{Ok}$ in the longitudinal position is calculated as the sum from the strip thickness $D_m$ and the new correction value ΔK;

i) In which the steps d) to h) are repeated within a setting cycle until the measuring unit has been set up to a maximum offset setting transverse to the longitudinal position and back again as far as a position in which the strip thickness $D_0$ is measured directly in the longitudinal position by the measuring unit; and j) In which the thickness transverse profile is determined from the repeatedly determined strip thicknesses $D_m$ and the thickness longitudinal profile is determined from the repeatedly corrected strip thicknesses $D_{Ok}$.

The process sequence described can also be designated as a traversing multi-channel profile measurement and can be performed with one measuring unit for the objective on which the invention is based.

If, during the thickness transverse profile acquisition, the measuring unit is located outside the longitudinal position, the strip thickness is determined uniformly in the longitudinal position, since the changes in thickness which result from the thickness transverse profile are conducted additively by means of a mathematical process. In this situation, the thickness transverse profile is acquired by means of thickness differentials to the strip thickness in the longitudinal position, since the strip thickness varies in the longitudinal direction of the strip. Overall, it must be taken into account for the precision of the process that the deviations between the strip thickness in the centre of the strip and at the outer edge will lie in a range, for example, of less than 5%.

Accordingly, with the sequence of the process according to the invention, it is guaranteed that the technical elaboration of the measuring device will be reduced, while still retaining a precise determination of the thickness transverse profile and the thickness longitudinal profile of a running strip of material. Because the process according to the invention is used in particular in the intake area of a roller train, the strip running speed is so low that, with a traversing speed in the range from 5–15 m/min, a satisfactorily close-meshed measurement of the material strip can be achieved.

According to a further doctrine of the present invention, the technical problem described heretofore is resolved by a device for determining the thickness transverse profile and the thickness longitudinal profile of a running strip of material, with a housing, with at least one radiation source arranged in the housing, and with at least two detectors arranged in the housing which are arranged at a distance from one another transverse to the direction of run of the strip, and are aligned at different angles to the minimum of one radiation source, whereby the material strip is arranged between the radiation source and the detectors, and whereby the detectors assess the material strip in sections transverse to the direction of run of the strip, and that setting media for the synchronous adjustment of the radiation source and the detectors relative to the material strip.

In addition to this, the technical problem is resolved by the use of a device as described heretofore for the performance of the process described above.

BRIEF DESCRIPTION OF THE DRAWINGS

Further features and advantages of the present invention are explained in greater detail hereinafter on the basis of embodiments, whereby reference is made to the appended drawings.

DETAILED DESCRIPTION OF THE INVENTION

Figure 1:
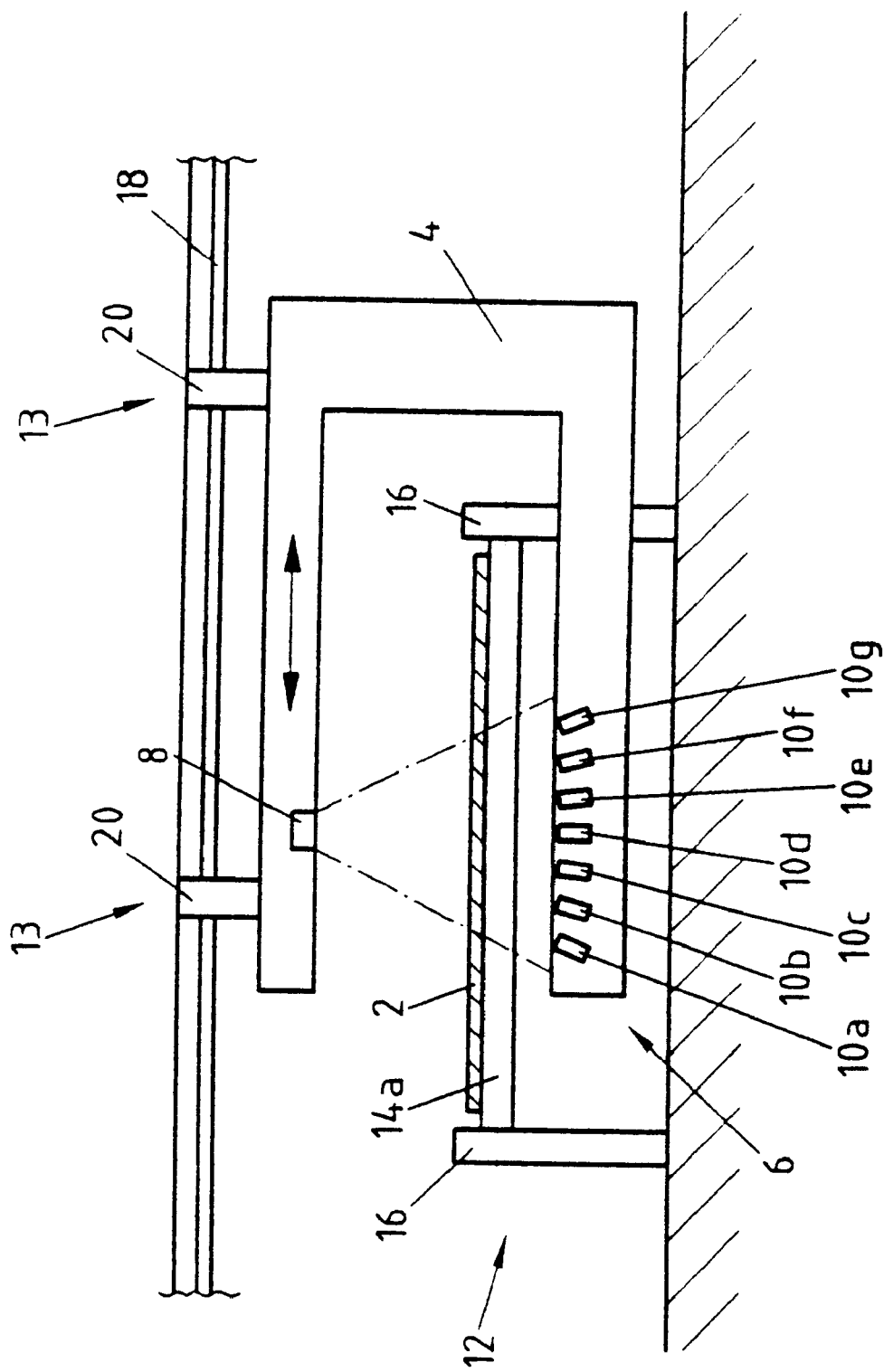
FIG. 1 is a first embodiment of a device according to the invention, in a side view in the direction of run of the strip.
Figure 2:
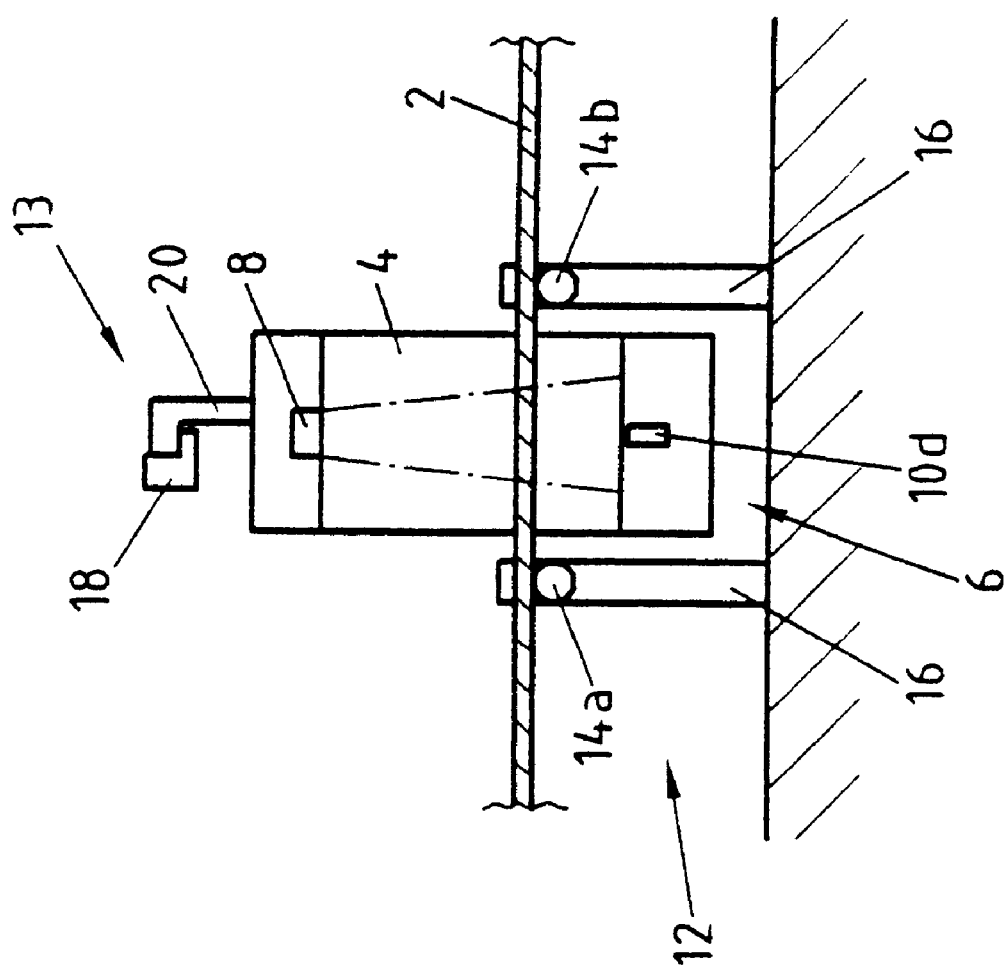
FIG. 2 is a device represented in FIG. 1 in a side view transverse to the direction of run of the strip.

FIGS. 1 and 2 show a first embodiment of a device according to the invention for the determination of the thickness transverse profile and the thickness longitudinal profile of a running material strip 2. The device features a housing 4, and at least one measuring unit 6 arranged in the housing 4, which features a radiation source 8 and seven detectors 10a–10g. The detectors 10a to 10g are arranged at a distance from one another transverse to the direction of run of the strip, and are aligned at different angles to the radiation source 8. In addition to this, provision is made for a guide device 12 arranged outside the device, which guides the material strip 2 and arranges the material strip 2 between the radiation source 8 and the detectors 10a–10g. The detectors 10a–10g accordingly assess the material strip 2 section by section transverse to the direction of run of the strip. In addition to this, adjustment setting media 13 are provided, for the synchronous movement of the radiation source 8 and the detectors 10a–10g relative to the material strip 2.

The housing 4 is designed to be in a C-shape, in order to carry both the radiation source 8 and the detectors 10a–10g, and, at the same time, to encompass the material strip 2. The radiation source 8 typically emits high-energy electromagnetic radiation, in particular gamma radiation or X-ray radiation.

Figure 4:
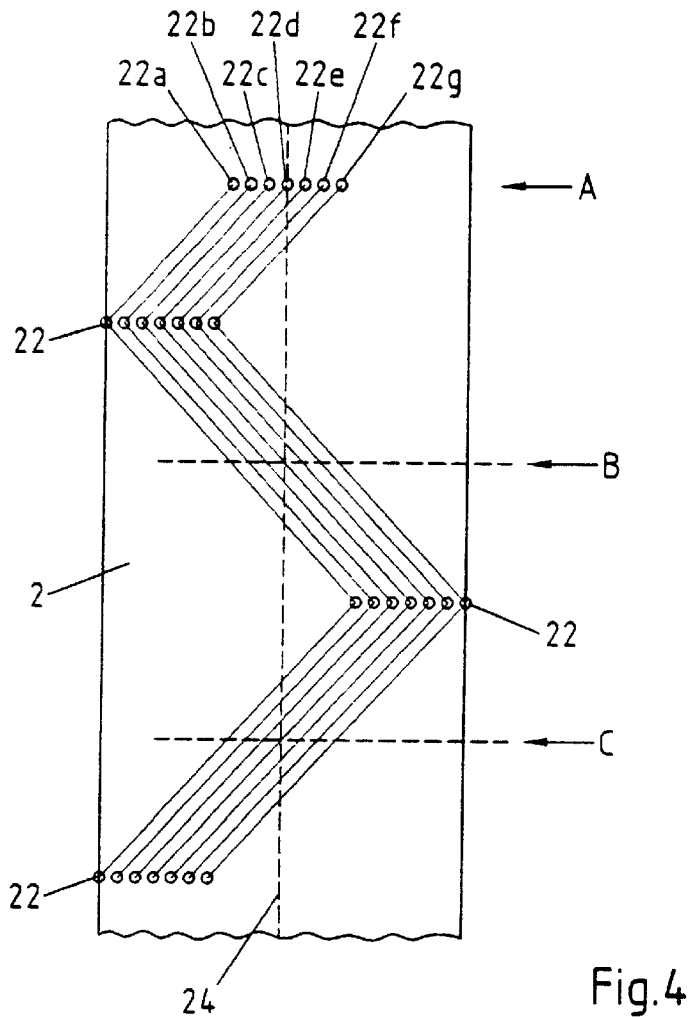
FIG. 4 is a schematic representation of a material strip in a plan view, which represents the adjustment movement of the measurement area along the surface of the material strip.

The outer detectors 10a and 10g provide attestation during the setting movement of the measuring unit 6 that the outer edge of the material strip 2 has been reached; see FIG. 4, in which the movement of the measuring area along the surface of the material strip 2 is represented.

The detectors 10a–10g are designed, for example, as ionisation chambers, scintillation counters, counter tubes, or semi-conductor detectors. The choice of the detector type is effected on the basis of the radiation source 8 used and its intensity.

The measuring unit 6 described here is provided with seven detectors 10a–10g, but in principle measuring units with more or fewer detectors are conceivable. The choice of the number of detectors 10 is effected as a function of the type and activity or metering capacity of the radiation source used and the type of detectors used with regard to the desired precision of measurement, including the statistical noise.

The guide device 12, which does not necessarily belong to the device, features two rollers 14a and 14b, which are carried by a base frame 16. In this situation the two rollers 14a and 14b are arranged on both sides of the area covered by the measuring unit 6, so that the material strip 2 adopts a defined position within the device.

The adjustment setting media 13 allow for the cyclic assessment of the entire width of the material strip 2. To achieve this, they are designed in such a way that they move the entire measuring unit 6, consisting of the radiation source 8 and the detectors 10a–10g, relative to the material strip 2.

As FIGS. 1 and 2 show, the setting adjustment media 13 move the housing 4 with the radiation source 8 and the detectors 10a–10g relative to the material strip 2. This is guaranteed by the fact that the position adjustment media 13 feature a linear guide 18, and a guide carriage 20 engaging with this linear guide 18. For the movement setting, in addition, provision is made for a linear drive, not shown in detail. Due to the movement of the housing 4 as a whole, it is ensured that the radiation source 8 and the detectors 10a–10g are always arranged in a pre-adjusted position to one another during the adjustment movement. A disadvantage, however, is that a relatively substantial weight must be moved during the adjustment movement process.

Figure 3:
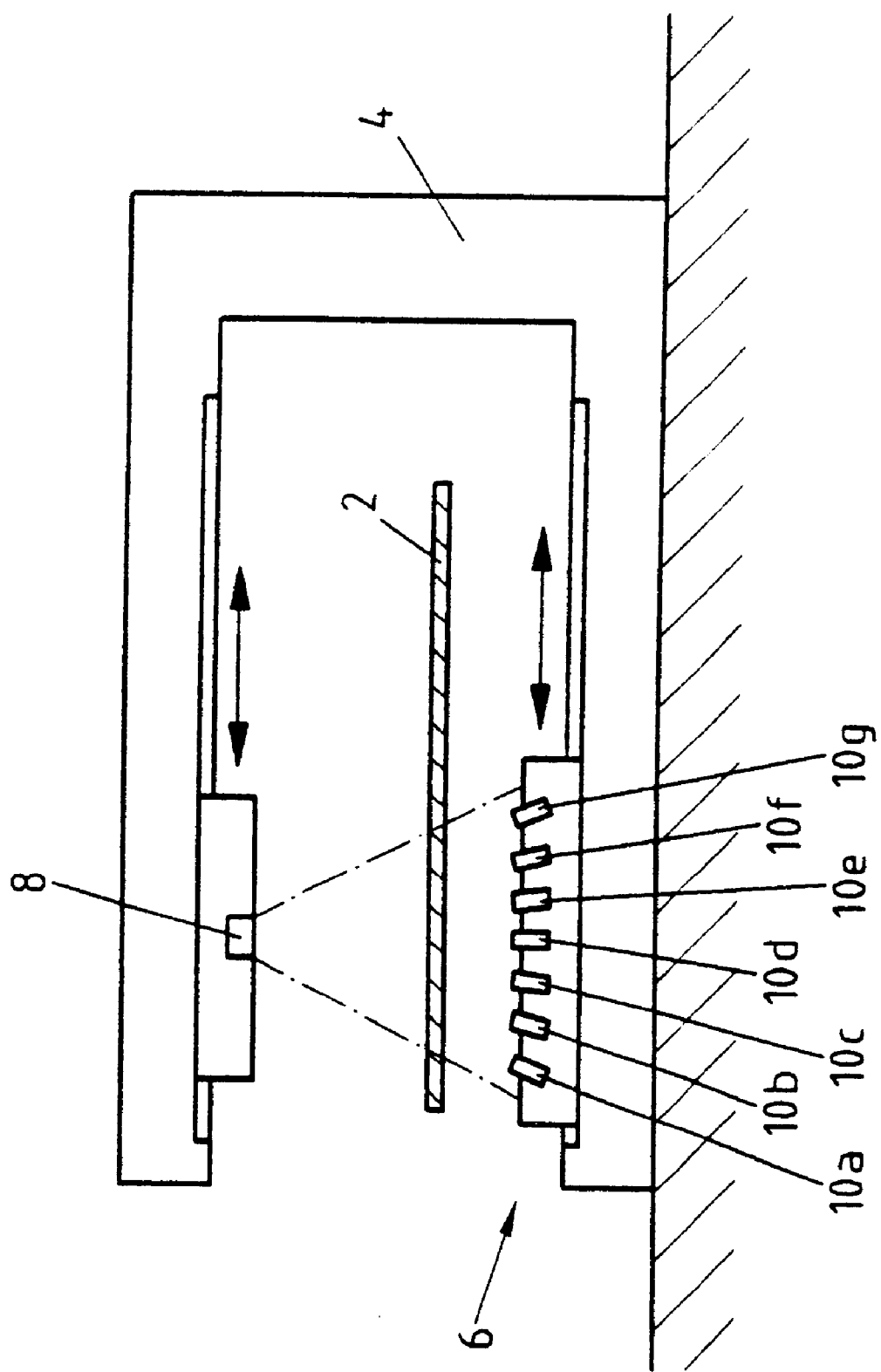
FIG. 3 is a second embodiment of a device according to the invention in a side view in the direction of run of the strip.

With the embodiment shown in FIG. 3, by contrast, the setting movement media 13 move the radiation source 8 and the detectors 10a–10g relative to the housing 4, so that a smaller mass needs to be moved. However, during the separate adjustment movement, it must be guaranteed that the radiation source 8 and the detectors 10a–10g remain aligned with one another.

In addition to this, the setting adjustment media 13 feature a measuring device, not shown in the drawing, for determining the position of the measuring unit 13 relative to the material strip 2. Accordingly, the position data of the measuring unit can be acquired and passed on to the evaluation process for the measured data as described hereinafter.

The process according to the invention is described hereinafter in detail on the basis of FIGS. 4 and 5.

Figure 5:
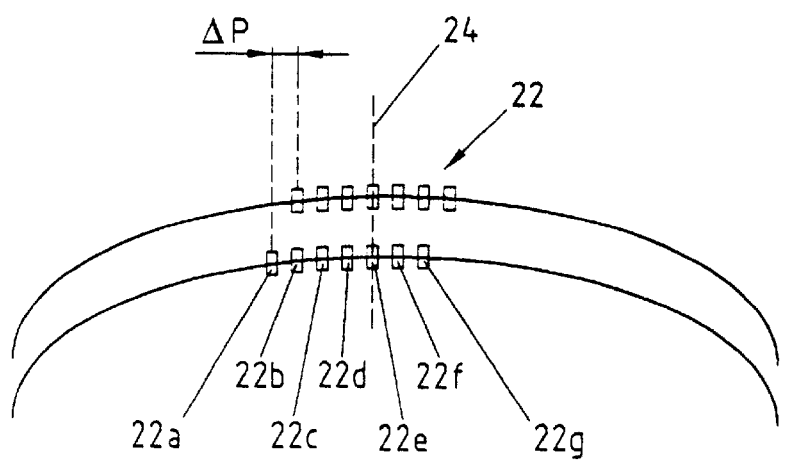
FIG. 5 is a schematic representation of the thickness transverse profile and of the positions of the measuring area at different moments of time during the measuring process.

The process according to the invention, for the determination of the thickness transverse profile and the thickness longitudinal profile of a running strip of material 2, features the following steps:

a) With the aid of a measuring unit 6, strip thicknesses D are determined in seven measuring areas 22, whereby the measuring areas 22 are arranged transverse to the direction of run of the strip, at a distance from one another. The measured value for each measuring area is processed over the duration of a predetermined measurement cycle. A typical value for a measurement cycle is, for example, 10 ms. The determination of the strip thickness D from the intensity measured by the detector 10 is effected with the aid of the inherently known angle of the detector to the material strip 2.

b) The longitudinal position 24 of the thickness longitudinal profile to be determined is determined longitudinally to the direction of run of the strip. As FIGS. 4 and 5 show, the longitudinal position 24 is arranged in the centre of the material strip 2.

c) The strip thickness $D_0$ is measured directly at an initial position A in the longitudinal position 24 by the measuring unit 6, and the value of a correction value $\Delta K$ is set as equal to zero. To do this, the measuring unit 6 is arranged in such a way that the longitudinal position 24 is arranged within the area acquired by the measurement areas 22a–22g of the material strip 2 and the strip thickness $D_0$ is acquired directly from a measuring area 22, for preference from the central measuring area 22d. Likewise, the strip thickness $D_0$ can be calculated by an interpolation of the strip thicknesses D of the measurement area 22.

d) The measuring unit 6 is set transverse to the direction of run of the strip for a predetermined period of time $t_0$ to $t_1$, in FIGS, 4 and 5 to the left, whereby FIG. 5 represents the thickness transverse profile and the position of the measuring unit 6 at the moments to and $t_1$. The size of the adjustment movement $\Delta P$, related to the longitudinal position, is determined as $\Delta P=P(t_1)-P(t_0)$. The value $\Delta P$ in this situation lies for preference in the order of the distance between two measuring areas 22 in each case, as can also be seen in FIG. 5.

The measuring unit 6 is moved transversely to the direction of run of the strip at a predetermined traversing speed, whereby the traversing speed is reduced in the area of the edges of the material strip 2. A typical value for the traversing strip is, for example, approx. 5–15 m/min., but other values are also possible and technically feasible. The size of the adjustment movement $\Delta P$ is then derived from the duration of the predetermined correction cycle and from the traverse speed.

e) From the strip thicknesses D determined in the measuring areas 22, the gradient k of the strip thicknesses D transverse to the direction of run of the strip are calculated, in which situation this is carried out for preference in each case after the performance of a correction cycle. This duration of the correction cycle is dependent on the statistical noise of the radiation source, which is shown, for example, in the strip thicknesses determined, and serves to reduce the noise by the formation of mean values.

The duration of the correction cycle is adjusted at least for as long as the duration of a measuring cycle, whereby for preference the duration of the correction cycle is set as a multiple of the duration of the measurement cycle. A typical value for the duration of a correction cycle, which in each case is selected as a function of the technical preconditions, amounts for example to about 100 ms. To calculate the gradient k, a value of the strip thickness D of each measurement of each measurement area is used, determined via the correction cycle.

With the aid of a linear regression, the gradient k is calculated from the strip thicknesses D and the absolute positions of the measurement area transverse to the direction of run of the strip. In other words, a polynomial of the first order is adapted to the strip thickness curve. The regression calculation is carried out, for example, according to the Gauss-Jordan process, the least squares method. The linear correction in this situation leads to good results, because the changes in the thickness transverse profile are small over an adjustment movement of the measuring unit of $\Delta P$ in the range of the distance between each two measurement areas 22, and allow for a linear adaptation.

In general, it is also possible that, with the aid of n measuring areas 22, with n greater than 2, and with the aid of a regression calculation of a polynomial with the degree n–1, the gradient k is calculated from the strip thicknesses D and the absolute positions of the measurement area 22 transverse to the direction of run of the strip. This accordingly achieves a higher degree of precision.

f) The correction value $\Delta K$ is recalculated according to the formula $\Delta K=\Delta K+k\times\Delta P$. This corresponds to a linear adaptation. The correction value $\Delta K$ can however also be calculated with correction terms of the second and possibly higher order, provided that in step e) a polynomial with an order greater than 2 has been adapted.

g) From the strip thicknesses D(i), i=1–5, determined in the measurement areas 22b–22f, the mean strip thickness $D_m$. is calculated, for preference as an arithmetic mean. In this situation, in particular, the mean strip thickness ($D_m$) can be calculated in the middle of the area of the material strip 2, encompassed by the measurement areas.

h) The corrected strip thickness $D_{0k}$ in the longitudinal position 24 is then calculated according to the following formula:

$$D_{0k} = \frac{\sum_{i=1}^{i=5} D(i)}{5} + \Delta K, i = 1\text{--}5,$$

where the two outer measuring areas 22a and 22g with the strip thicknesses D(0) and D(6) remain unconsidered. In a process with a different number of measurement areas 22, the formula is to be used accordingly for other values of the index i.

i) The steps d) to h) are repeated within a setting adjustment cycle. The duration of a setting adjustment cycle lasts until the measuring unit 6 has been moved as far as a maximum adjustment position transverse to the longitudinal position and back again to a position in which the strip thickness $D_0$ is measured directly in the longitudinal position 24 by the measuring unit 6.

The maximum adjustment setting with the embodiment presented in FIG. 4 is specified relative to the longitudinal position by the edge of the material strip 2, so that essentially the entire width of the material strip 2 is assessed. To do this, the two outer measurement areas are used to assess the edges of the material strip 2. Accordingly, for example, with the use of seven detectors 10a–10g, the two outer detectors 10a and 10g are used as attestation media for the edges of the material strip 2, while the detectors 10b–10f are used for the determination of the strip thickness.

j) The thickness transverse profile is then determined from the repeatedly determined strip thickness $D_m$ and the thickness longitudinal profile from the repeatedly corrected strip thicknesses $D_{0k}$.

As a dimension for a quality control, and therefore as a dimension for the precision of the correction of the last adjustment setting cycle for the process described heretofore, the difference between the strip thickness $D_0$ determined in step c) in the longitudinal position at the beginning of the adjustment setting cycle and the corrected strip thickness $D_{0k}$ v determined in step i) at the end of the setting adjustment cycle are used.

Heretofore the determination of the thickness transverse profile on one side of the longitudinal position 24 has been described, in that the measuring unit 6 has been moved in a direction from the longitudinal position to an edge of the material strip 2 and back. This is between the positions A and B in FIG. 4. In order to acquire alternatingly the entire width of the material strip 2, the measuring unit 6 is therefore moved alternately to both sides, transverse to the longitudinal position 24, in order to determine the thickness transverse profile; see the section B to C in FIG. 4.

One characteristic of the process according to the invention lies in the fact that, with the repeated summation of the value ΔK, a degree of error precision arises until the edge of the material strip 2 is reached.

During the opposed adjustment movement, this error is largely eliminated again due to the inverted sign of the gradient value.

What is claimed is:

1. A process for the determination of a thickness transverse profile and a thickness longitudinal profile of a running strip of material (2) comprising:
   a) determining with a measuring unit (6) a strip thickness D in at least two measurement areas (22), wherein the measurement areas (22) are arranged at a distance from one another transverse to a direction of travel of the strip,
   b) determining a longitudinal position (24) of the thickness longitudinal profile longitudinally to the direction of travel of the strip,
   c) measuring directly the strip thickness $D_0$ in the longitudinal position (24) by the measuring unit (6) and setting the value of a correction value ΔK equal to zero,
   d) moving the measuring unit (6) transverse to the direction of travel of the strip and determining a size of the movement ΔP in relation to the longitudinal position,
   e) calculating a gradient k of the strip thicknesses D transverse for the strip travel direction from the strip thicknesses D determined in the measurement areas (22),
   f) recalculating the correction value ΔK as the sum of the previous correction values ΔK and the product of the gradient k and the size of the movement ΔP,
   g) calculating a mean strip thickness $D_m$ from the strip thicknesses D determined in the measurement areas (22),
   h) calculating a corrected strip thickness $D_{0k}$ in the longitudinal position (24) as the sum of the strip thickness $D_m$ and the new correction value ΔK,
   i) repeating steps d) to h) with an adjustment movement cycle, until the measuring unit (6) has been moved to a maximum movement transverse to the longitudinal position and back again to a position in which the strip thickness $D_0$ in the longitudinal position (24) is measured directly by the measuring unit (6), and
   j) determining the thickness transverse profile from the repeatedly determined strip thickness $D_m$ and the thickness longitudinal profile from the repeatedly corrected strip thickness $D_{0k}$.

2. The process according to claim 1, in which the measuring unit (6) is formed from at least one detector (10) per measurement area (22) and at least one radiation source (8).

3. The process according to claim 1, in which, with the aid of the detectors (10), the weakened intensity of the radiation through the material strip (2) is measured.

4. The process according to claim 1, in which a plurality of measurement areas (22) are used in one measuring unit (6).

5. The process according to claim 4, wherein there are five to seven measuring areas.

6. The process according to one of claim 1, in which the measured value is processed in each measurement area over the duration of a specified measurement cycle.

7. The process according to claim 1, in which, in step b), the longitudinal position (24) is arranged in the centre of the material strip (2).

8. The process according to claim 1, in which, in step c), the measuring unit (6) is arranged in such a way that the longitudinal position (24) is arranged within the area of the material strip (2) which is acquired by the measuring areas (22), and the strip thickness ($D_0$) is calculated by an interpolation of the strip thicknesses (D) measured in the measurement areas (22).

9. The process according to claim 1, in which the longitudinal position (24) is acquired directly from one measurement area (22).

10. The process according to claims 9, in which the longitudinal position (24) is acquired directly from the mean of an odd number of measurement areas.

11. The process according to claim 1, in which, in step d), the measuring unit (6) is moved at a predetermined transverse speed transverse to the direction of run of the strip.

12. The process according to claim 11, in which the transverse speed is reduced in the area of the edges of the material strip (2).

13. The process according to claim 11, in which the size of the adjustment movement (ΔP) is calculated from the duration of the predetermined correction cycle and from the transverse speed.

14. The process according to claim 1, in which, in step e), the gradient (k) of the strip thicknesses (D) is carried out after the termination of the correction cycle.

15. The process according to claim 14, in which the duration of the correction cycle is set to be at least as long as the duration of a measurement cycle.

16. The process according to claim 15, in which the duration of the correction cycle is set as a multiple of the duration of the measurement cycle, and in which, in order to calculate the gradient (k), a value is used of the strip thickness (D) of each measurement area (22) determined over the correction cycle.

17. The process according to claim 1, in which, with the aid of a linear regression, the gradient (k) is calculated from the strip thicknesses (D) and the absolute positions of the measurement area (22) transverse to the direction of run of the strip.

18. The process according to claim 1, in which, with the aid of n measurement areas, with n greater than 2, and with the aid of a regression calculation of a polynomial with the degree n–1, the gradient (k) is calculated from the strip thicknesses (D) and the absolute positions of the measurement area (22) transverse to the direction of run of the strip.

19. The process according to claim 1, to in which, in step f), the correction value ΔK is calculated with correction terms of the second or higher degree.

20. The process according to claim 1, in which, in step g), the mean strip thickness ($D_m$) is calculated as the arithmetic mean of the strip thicknesses (D) of the measurement area (22).

21. The process according to claim 1, in which the mean strip thickness ($D_0$) is calculated in the middle of the area of the material strip (2) encompassed by the measurement areas (22).

22. The process according to claim 1, in which, in step i), the maximum adjustment movement relative to the longitudinal position (24) is specified by the edge of the material strip (2).

23. The process according to claim 1, in which the two outer measurement areas (22a, 22g) are used to acquire the edges of the material strip (2).

24. The process according to claim 1, in which the difference between the strip thickness ($D_0$) determined in step c) in the longitudinal position at the beginning of the adjustment movement cycle and the corrected strip thickness ($D_{0k}$) determined in step i) at the end of the adjustment movement cycle are used as a measure of the precision of the correction of the last adjustment movement cycle.

25. The process according of claim 1, in which the measuring unit (6) is adjusted alternately to both sides transverse to the longitudinal position (24) in order to determine the thickness transverse profile.

* * * * *